US009805696B2

(12) United States Patent
Brabender (10) Patent No.: US 9,805,696 B2
(45) Date of Patent: Oct. 31, 2017

(54) SYNCHRONIZED IMAGE EXPANSION (71) Applicant: Renesas Electronics America Inc., Santa Clara, CA (US)

(72) Inventor: Jon Matthew Brabender, Cary, NC (US)

(73) Assignee: Renesas Electronics America, Santa Clara, CA (US)

(*) Notice: Subject to any disclaimer, the term of this patent is extended or adjusted under 35 U.S.C. 154(b) by 0 days.

(21) Appl. No.: 14/919,965

(22) Filed: Oct. 22, 2015

(65) Prior Publication Data

US 2017/0116966 A1 Apr. 27, 2017

(51) Int. Cl.
*H04N 19/423* (2014.01)
*G06T 9/00* (2006.01)
*G09G 5/36* (2006.01)
*G09G 5/393* (2006.01)

(52) U.S. Cl.
CPC .............. *G09G 5/363* (2013.01); *G06T 9/00* (2013.01); *G09G 5/393* (2013.01); *H04N 19/423* (2014.11); *G09G 2340/02* (2013.01); *G09G 2360/121* (2013.01); *G09G 2360/18* (2013.01)

(58) Field of Classification Search
None
See application file for complete search history.

(56) References Cited

U.S. PATENT DOCUMENTS

| | | | | |
|---|---|---|---|---|
| 5,563,660 A * | 10/1996 | Tsukagoshi | .......... | H04N 7/0112 348/E7.015 |
| 5,592,236 A * | 1/1997 | Rosenbaum | ............. | H04N 9/76 345/589 |
| 5,822,504 A * | 10/1998 | Ishibashi | ................. | G06T 9/005 358/1.11 |
| 6,088,047 A * | 7/2000 | Bose | ...................... | H04N 19/51 345/531 |
| 6,301,299 B1 * | 10/2001 | Sita | .......................... | G09G 5/39 348/714 |
| 8,111,331 B2 * | 2/2012 | Arnao | ................... | G06T 3/4023 345/667 |
| 2003/0164836 A1 * | 9/2003 | Tang | ......................... | G06F 5/10 345/558 |
| 2009/0051815 A1 * | 2/2009 | Ishikawa | .................. | G09G 5/22 348/589 |
| 2013/0235417 A1 * | 9/2013 | Yamamoto | ............ | G06F 9/4401 358/1.15 |
| 2016/0134878 A1 * | 5/2016 | Cheung | .................. | H04N 19/91 375/240.23 |

* cited by examiner

*Primary Examiner* — Joni Richer
(74) *Attorney, Agent, or Firm* — Campbell Stephenson LLP (57) ABSTRACT

Various systems and methods related to displaying images from compressed data. For example, one method involves expanding a first portion of compressed data. The expanded first portion is written to a first memory location in a first memory. In response to detecting that a first segment of the expanded first portion has been read, a second portion of the compressed data is expanded. The expanded second portion is written to the first memory location.

21 Claims, 8 Drawing Sheets

SYNCHRONIZED IMAGE EXPANSION

BACKGROUND OF THE INVENTION

A microcontroller unit (MCU) is small computer formed on an integrated circuit. MCUs provide embedded control of a wide range of devices, such as display devices, electric motors, voltage regulators, office machines, appliances, implantable medical devices, and the like.

MCUs are often used to provide graphics applications and control graphical displays. The settings in which graphical displays are implemented are becoming more and more ubiquitous. Along with the proliferation of graphical displays, an increase is being seen in the complexity and functionality of the graphical displays. Various challenges are associated with providing graphics applications. For example, graphics applications typically require relatively large amounts of data, which use large amounts of memory, and the on-chip memory of an MCU is typically relatively small. Also, large amounts of bandwidth are sometimes used to transfer the large amounts of data, and bandwidth availability for MCUs is typically relatively limited. Various techniques are employed to reduce the memory and bandwidth consumed by graphics applications. For example, off-chip memory can be used to store data for graphics applications. However, adding off-chip memory increases the complexity and cost of control systems. Given the challenges associated with providing graphics applications, mechanisms are desired to reduce the memory used for data associated with graphics applications.

SUMMARY OF THE INVENTION

Various systems and methods related to displaying images from compressed data are described herein. For example, one method involves expanding a first portion of compressed data. The expanded first portion is written to a first memory location in a first memory. In response to detecting that a first segment of the expanded first portion has been read, a second portion of the compressed data is expanded. The expanded second portion is written to the first memory location.

BRIEF DESCRIPTION OF THE DRAWINGS

The present disclosure may be better understood in its numerous objects, features, and advantages made apparent to those skilled in the art by referencing the accompanying drawings.

The use of the same reference symbols in different drawings indicates similar or identical items.

DETAILED DESCRIPTION

As noted, efforts are made to reduce memory and/or bandwidth consumed by graphics applications provided by an MCU. One graphics application provided by an MCU is known as graphics layering. Graphics layering involves simultaneously displaying multiple layers of graphic data, such as text and/or image data. For example, a foreground layer can display user information, such as information about car (e.g., speed, engine temperature, and the like), applications on a phone, status information concerning a device, or any other information. The foreground layer is displayed (superimposed) over a background layer. In one embodiment, the background layer is a static image and provides aesthetic enhancement.

Figure 1:
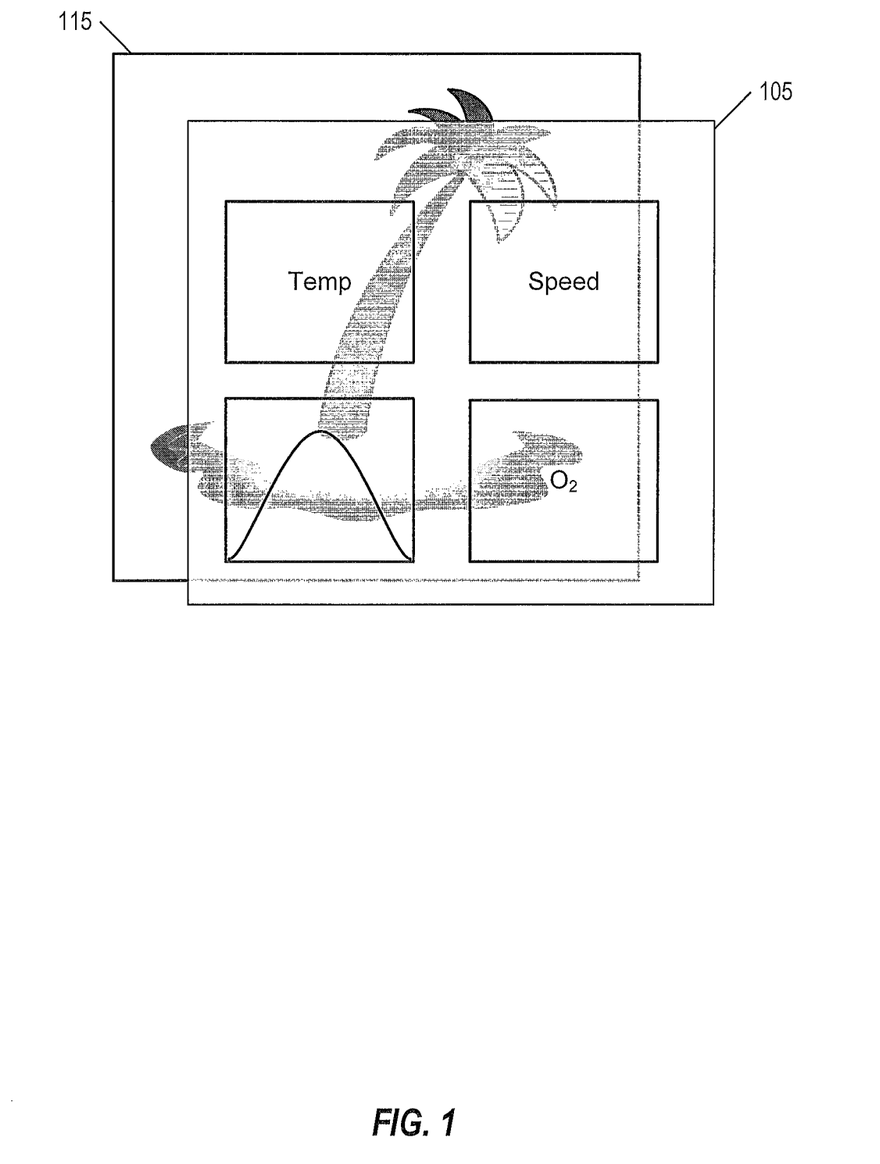
FIG. 1 is a block diagram illustrating an example of graphics layering.

For example, FIG. 1 shows a background layer 115 and a foreground layer 105. Foreground layer 105 shows information regarding, in this example, a motor. The foreground layer is displayed as being partially opaque. That is, an opacity value can be specified by a user that allows the background layer to be partially visible, or to show through, the foreground layer. Background layer 115 shows an aesthetically pleasing island scene. The background layer is configured to be completely opaque, or solid. Superimposing foreground layer 105 over background layer 115 produces a blended (layered) image that is more aesthetically pleasing than an image with no background, or a plain background, might be. While two layers are shown in FIG. 1, it is understood that additional layers can be blended.

Each layer (e.g., foreground layer and background layer) being displayed uses some memory. For example, the data for each layer is loaded into a respective frame buffer in random access memory (RAM) on the MCU. The data is read from the RAM by a display controller and sent to a display unit. The data can be updated in the RAM, and thus produce a changing graphical display. As noted, the foreground layer, in one embodiment, changes relatively often. To handle changes that occur during a display cycle, the foreground layer can be double-buffered. That is, two copies of the foreground layer can be stored in respective frame buffers in RAM, a first copy that is stored in a display frame buffer and that is being displayed, and a second copy that is stored in a working frame buffer and to which updates are directed. After the first copy is displayed, the display controller begins displaying the second copy, and the first copy becomes the working copy for changes. In one embodiment, a processor selects which frame buffer is being displayed and which is the working frame buffer. The processor detects when one frame buffer has been completely displayed and toggles between which frame buffer is being displayed and which frame buffer is the working frame buffer.

A frame buffer, in one embodiment, stores one entire frame of an image, where frame refers to data that fills a display screen. Thus, the size of the frame buffer depends on the resolution (number of pixels) of the display on which the image will be displayed. The size of the frame buffer also depends on the amount of data used for each pixel. Various color depths for each pixel are available, and each color depth uses a specific number of bits per pixel. For example, the color for each pixel can be encoded using 16 bits per pixel (bpp), 32 bpp, or some other value. As an example of the amount of RAM allocated for a frame buffer, consider that a wide quarter video graphics array (WQVGA) display is 480 pixels wide by 272 pixels high. In order to store a single frame, the frame buffer stores data for 130,560 pixels. The data for each pixel is typically formatted as red green blue (RGB) or alpha red green blue (ARGB) and uses 32 bits per pixel (32 bpp). 32 bpp provides 8 bits each for red, green, and blue values, and 8 bits for the alpha value, which determines opacity. In this example, the memory used to store the background and foreground layers would be approximately one megabyte (1 Mbyte). The calculation for this is 480*272*4 bytes/pixel*2 layers. In typical MCUs, where RAM is limited, this is problematic. For example, many MCUs have between 256 kilobytes and 512 kilobytes of RAM available for graphics usage. Therefore, allocating 1 Mb of RAM for the two layers would be impossible. Mechanisms exist to reduce memory usage, such as using 16 bpp instead of 32 bpp. Another way to enhance graphics capabilities is to use off-chip memory. However, these (and other) mechanisms have cost trade-offs, such as loss in resolution or image quality and increased bandwidth and processing requirements. Consumer demand for improved graphics features and performance continues to increase, increasing the value and importance of reducing memory usage associated with graphics applications.

Described herein are mechanisms that reduce memory usage associated with graphics applications. In one embodiment, only a part of a background layer is loaded into RAM such that at any time, only a portion of the background layer is stored in RAM. For example, rather than loading the full 272 lines of a background layer into RAM, a 16 line portion can be loaded into the RAM. This consumes approximately 30 KB (480*16*4) of RAM, instead of approximately 512 KB if the entire 272 lines were loaded into RAM. While 16 lines is given as an example, any other value can be specified.

A display controller (e.g., on the MCU) reads data from the frame buffer (also referred to herein as a line buffer when having a capacity of less than an entire frame) and causes the data to be transmitted to a display unit (e.g., a liquid crystal display (LCD) panel) coupled to the MCU, where the data is displayed. If the background layer is composed of a repetitive pattern, the same 16 lines can be used to fill the entire display, e.g., the same 16 lines of data can be displayed repeatedly, such that the same data is displayed at lines 1-16 of a display as at lines 17-32 as at lines 33-48, and so on. The display controller reads data starting at an initial location (e.g., the beginning) of the line buffer. In response to reaching the end of the line buffer, the display controller returns to the beginning of the line buffer and again begins reading from the initial location. Typically, the display controller only returns to the beginning of a frame buffer once per frame, that is, after an entire frame has been read from the frame buffer and displayed. Once an entire frame has been read and displayed, the display controller reads and displays the frame again. Displays are typically refreshed periodically. That is, whether data being displayed has changed or not, the display is re-written, or refreshed, which involves reading the data from memory and writing the data to the display. The rate at which a display is refreshed depends on various parameters, but a typical rate is 60 Hertz. That is, the entire display is refreshed 60 times per second, regardless of whether the data has changed since the last time the display was written. In the case where a smaller (than an entire frame) line buffer is used, the display controller can repetitively read the same data and display data from the same location in the line buffer multiple times per frame. For example, if the line buffer capacity is 16 lines, and the frame height is 272 lines, the display controller displays the entire contents of the line buffer 18 times per frame (272/16).

However, if the background layer comprises an image that includes varied shapes and colors throughout the entire space of the frame, rather than a repetitive image, after the first portion of the image is displayed, the next portion of the image is loaded into the line buffer before the display controller is ready to read the next portion. In this way, when the display controller is ready to read more data from the line buffer, the data includes the next portion of the image that is to be displayed. This involves synchronizing the loads into the line buffer to occur before subsequent reads by the display controller, which involves utilization of a mechanism for writing into the line buffer that occurs more quickly than the reads from the line buffer. This occurs repetitively until the entire image (e.g., a single frame) has been displayed.

The entirety of the background layer data is stored in compressed form, for example in ROM, with only enough data for 16 lines (for example) of a display being expanded (decompressed) at a time and stored in RAM. Determining which portion of the compressed data to expand and load into RAM involves synchronizing the expansion and loading of the background layer such that the portion of the background layer that is to be displayed is loaded prior to the time the display controller reads the portion of the background layer from RAM. Since the background layer is typically static, storing the background layer as compressed data in ROM and only expanding and loading a portion of the background layer into RAM is possible. For data that is changed relatively frequently, such as foreground data, changes may be desired to various portions of the foreground data, and if less than the entire foreground data is loaded into RAM, changes to the portions that are not loaded into RAM could not be performed properly.

Figure 2:
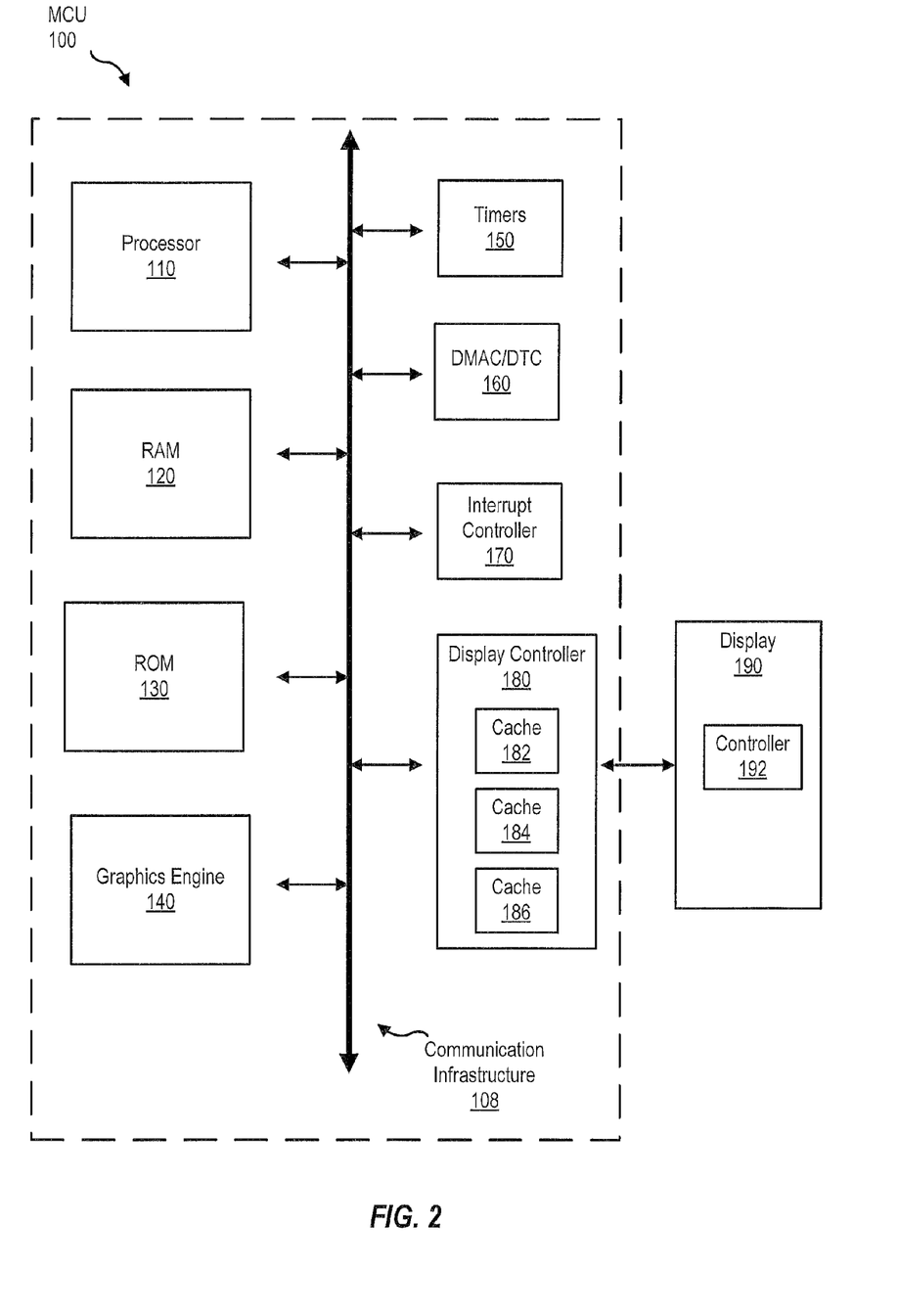
FIG. 2 is a block diagram illustrating an example MCU.

FIG. 2 shows a block diagram illustrating an example MCU 100. MCU 100 performs, in one embodiment, various graphics applications, including graphics layering or blending. Graphics layering involves one or more background layers and one or more foreground layers. MCU 100 includes one or more line or frame buffers that respectively store some or all of the data for each layer. MCU 100 is configured to provide the data to a display unit.

As shown, MCU 100 includes a processor 110. Processor 110 generally represents any type or form of processing unit capable of processing data or interpreting and executing instructions. Processor 110 is implemented, in one embodiment, as a central processing unit (CPU). Processor 110 is configured to control access to memory, such as reads and writes to on-chip memory, such as RAM 120 and ROM 130, as well as reads and writes to off-chip memory (not shown). Processor 110 is also configured to detect and respond to events, such as clock signals, timers, and interrupts. Processor 110 also controls access to communication infrastructure 108. Communication infrastructure 108 communicatively couples the components of MCU 100. In one embodiment, communication infrastructure 108 includes one or more buses, signal lines, and other devices that are configured to transmit control values, data, signals, addresses, instructions, and the like. For example, communication infrastructure 108 can include one more data buses, instructions buses, result buses, control buses, and the like. Communication infrastructure 108 is used by the components of MCU 100 and attached peripherals to transmit data and control signals between the components and attached peripherals.

Figure 3A:
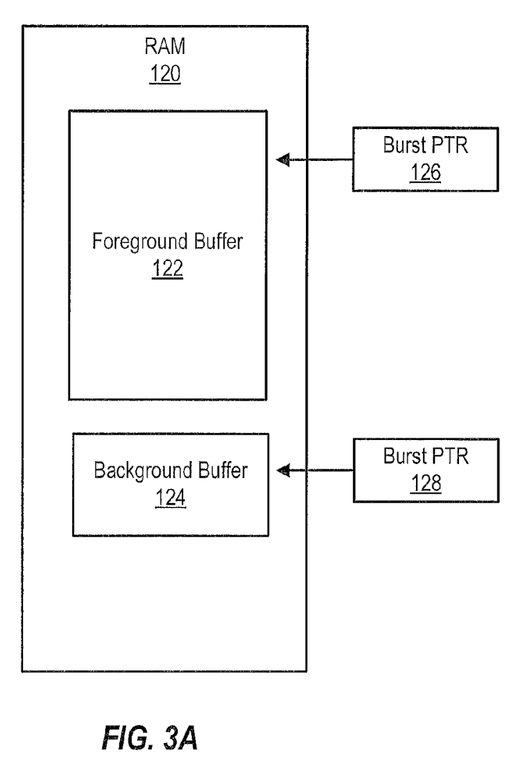
FIG. 3A is a block diagram illustrating additional details of a memory.

Also included in MCU 100 is RAM 120. RAM 120 generally represents any type or form of storage device or medium capable of storing data and/or other computer-readable instructions. In one embodiment, RAM 120 is implemented as volatile memory. RAM 120 includes one or more storage locations for storing graphic data, as shown in FIG. 3A. For example, RAM 120 includes one or more frame buffers for each graphics layer. In the case where the frame buffer stores a portion of a frame, e.g., is not large enough to store an entire frame, the frame buffer is also known as a line buffer. In one embodiment, processor 110 allocates portions of RAM 120 for the frame buffers, and assigns a size for each frame buffer, including starting and ending address values.

Figure 3B:
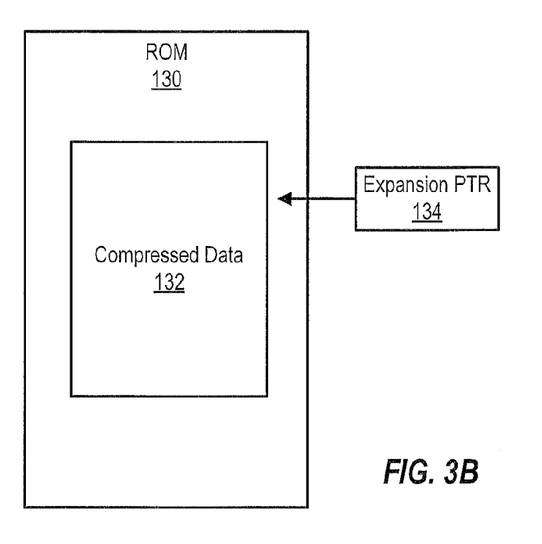
FIG. 3B is a block diagram illustrating additional details of a memory.

ROM 130 is also included in MCU 100, and generally represents any type or form of storage device or medium capable of storing data and/or other computer-readable instructions. In one embodiment, ROM 130 is implemented as non-volatile memory, such as flash memory. As shown in FIG. 3B, ROM 130 includes compressed data, such as data that includes an image used as background layer data. The background layer data can be compressed using any known compression algorithm, for example, JPEG, run length encoding (RLE), or any other compression suitable for graphic data.

MCU 100 also includes a graphics engine 140. Graphics engine 140 is configured to expand (decompress) compressed data. In one embodiment, graphics engine 140 reads compressed data from ROM 130. Graphics engine 140 determines how much compressed data to read. For example, graphics engine 140 can be configured to always read a specified amount of data in response to a signal or instruction to expand data, or graphics engine 140 can determine how much data to read based on an instruction, for example, an instruction received from processor 110, or based on a specified location in ROM 130 from which the compressed data is being read. The amount of data to be read can be specified in terms of compressed data or decompressed data. In response to receiving an instruction to decompress data, graphics engine 140 determines the address in ROM 130 from which compressed data is to be read. For example, the instruction to read data can include an address or information identifying a pointer. Graphics engine 140 expands the compressed data from the specified location in ROM 130 using a decompression algorithm. After decompressing the compressed data, graphics engine writes the decompressed data to an appropriate location in a frame buffer in RAM 120. Graphics engine 140 determines the appropriate location based, for example, on information included in an instruction to read data, such as an address in RAM 120 or information identifying a pointer to a location in RAM 120. In one embodiment, compressed data is stored as JPEG data, and the graphics engine includes a JPEG engine. In one embodiment, the functions described above with regard to graphics engine 140 are performed by processor 110.

Also included in MCU 100 are one or more timers 150. Timers are circuits that include one or more functional units such as compare/capture units, pulse-width modulation (PWM) units, and the like. Not all timer channels of an MCU are identical. Some timer channels of an MCU may include only compare/capture units, while other timer channels of the MCU include only PWM units. Still other timer channels of the MCU may contain both compare/capture units and PWM units and other functional units. Timer channels usually contain at least one n-bit counter register (hereinafter counter register), which stores an n-bit counter value (hereinafter counter value). Counter registers count pulses of a clock signal or pulses of an event signal. In other words, a counter register may increment or decrement its counter value with each pulse of a clock signal or each pulse of an event signal. For most counter registers, the counter value overflows to zero after it reaches its maximum value. Clock pulses are typically produced by a clock generator that is internal or external to the MCU. Scalar units in timer channels may adjust the frequency of the clock signal. Event pulses are generated by devices that are internal or external to the MCU. Event pulses are generated with corresponding events. For example, a comparator internal to an MCU may generate an event pulse when the comparator detects equality between two input values, or that a certain amount of data has been read. Or, an MCU may receive an event pulse generated by a magnetic sensor of an external device when the sensor detects a magnetic field of certain strength. Timers 150 are used to synchronize or control the occurrence of one more activities. For example, one of timers 150 can generate a periodic signal that is used to indicate when a read or write should be performed.

MCU 100 also includes a DMAC/DTC module 160 that provides direct memory access control (DMAC) and/or data transfer controller (DTC) functionality. Interrupt controller 170 generates interrupts that can be used to indicate when an action should be performed, such as a read or write. These peripherals offload some of the processing tasks from processor 110. For example, processor 110 can initiate a transfer of data from ROM 130 to RAM 120 or from RAM 120 to display controller 180, and can proceed with other tasks, relying on DMAC/DTC module 160 and/or interrupt controller 170 to complete the tasks associated with the transfer and send a notification once the transfer is complete.

Also included in MCU 100 is a display controller 180. Display controller 180 controls one or more external displays, such as display 190. As shown, display controller 180 includes several caches 182-186. Display controller reads data, for example, from RAM 120, and stores the data in its caches. Display controller 180 also writes data to display 190. For example, display controller 180 is configured to read a specified amount of data into its caches in a burst. Display controller 180 writes the data from one or more of its caches to display unit 190 one pixel of data at a time. Alternatively, display controller 180 writes the data from one or more of its caches to display unit 190 in multi-pixel bursts.

Display 190 is implemented in one example as a thin film transistor (TFT) liquid crystal display (LCD) unit. Display 190 includes controller 192. Controller 192 receives data from display controller 180, and writes the data to the pixels that form the display 190. Controller 192 also generates horizontal and vertical synchronization signals. Horizontal synchronization signals indicate when the last pixel in a row has been written, and vertical synchronization signals indicate when the last row in a frame has been written. Display 190 transmits these signals to display controller 180, where they are used to time the reading and writing of data. In one embodiment, each pixel of display 190 is refreshed at a specified frequency, e.g., 60 Hz.

FIG. 3A shows additional details of RAM 120, as shown in FIG. 2. RAM 120 includes a frame buffer identified as foreground buffer 122. Though only a single foreground buffer is shown, it is understood that additional foreground buffers can be included. For example, the foreground layer can be double-buffered, with changes being applied to one of the foreground buffers while the other foreground buffer is used for displaying foreground data. The foreground buffer is also known as a frame buffer in one embodiment, and stores one frame of data. In one embodiment, foreground data is loaded into foreground buffer 122 in response to instructions from a processor, for example, processor 110 of FIG. 2. Data is read from foreground buffer 122 by a display controller, for example, display controller 180 of FIG. 2.

Also shown in FIG. 3A is burst pointer 126. Burst pointer 126 is also referred to as a source pointer since it points to a foreground buffer which is a source of data to be displayed.

Display controller 180 accesses foreground buffer 122 at a location indicated by burst pointer 126. Display controller 180 reads a burst of data, for example, 512 or 1024 pixels worth of data, and stores them in a cache, such as cache 182. In response to the data being read, burst pointer 126 is updated to point to the next location from which display controller 180 will read data. In one embodiment, processor 110 updates burst pointer 126. Burst pointer 126 includes information identifying a location in RAM 120, such as a logical or physical address or an offset from the beginning of foreground buffer 122. Burst pointer 126 can be stored in RAM 120, or elsewhere, such as in cache maintained by processor 110.

RAM 120 also includes a background buffer 124, also known as a line buffer, configured to store background layer data. Background buffer 124 includes a portion of the background layer data, where the portion is less than the entire background layer. In one embodiment, background buffer 124 includes 16 lines of data. This represents a significant memory reduction, as the entire background layer would include, in the case of WQVGA, include 272 lines of data. The number of lines that are stored in background buffer 124 is configurable manually, e.g., by a user, or automatically, e.g., by processor 110. In one embodiment, background buffer 124 is divided into multiple sections. For example, background buffer 124 can be divided into two sections. In response to detecting that one of the sections has been read in its entirety, display controller 180 overwrites the section with another portion of background layer data. In this manner, by the time the section of background buffer 124 that is currently being read has been read in its entirety, the other section has another portion of background layer data to be read.

Burst pointer 128 points to a location in background buffer 124 from which data will be read, for example, by display controller 180. In response to display controller 180 reading a burst of data, such as 512 or 1024 pixels worth of data, burst pointer 128 is updated. In one embodiment, processor 110 updates burst pointer 128. Burst pointer 128 includes information identifying a location in RAM 120, such as a logical or physical address or an offset from the beginning of background buffer 124. Burst pointer 128 can be stored in RAM 120, or elsewhere, such as in cache maintained by processor 110. While FIG. 3A shows a single foreground buffer and a single background buffer, additional buffers can be included for additional layers and multiple buffers can be used for a single layer.

FIG. 3B shows additional details of ROM 130, as shown in FIG. 2. ROM 130 includes compressed data 132. In one embodiment, compressed data includes an image file compressed according to a specified compression algorithm. A graphics engine, such as graphics engine 140 of FIG. 2, expands (e.g., decompresses) data from compressed data 132, and writes the expanded data to RAM 120. For example, in response to determining that some or all of background buffer 124 has been read, graphics engine 140 expands data from a location in ROM 130 pointed to by expansion pointer 134. In response to reading the compressed data, expansion pointer 134 is updated, for example, by processor 110, to point to the next location from which compressed data is to be read. In one embodiment, in response to expansion pointer 134 reaching the end of compressed data 132, expansion pointer 134 is reset to point to the beginning of compressed data 132.

Figure 4:
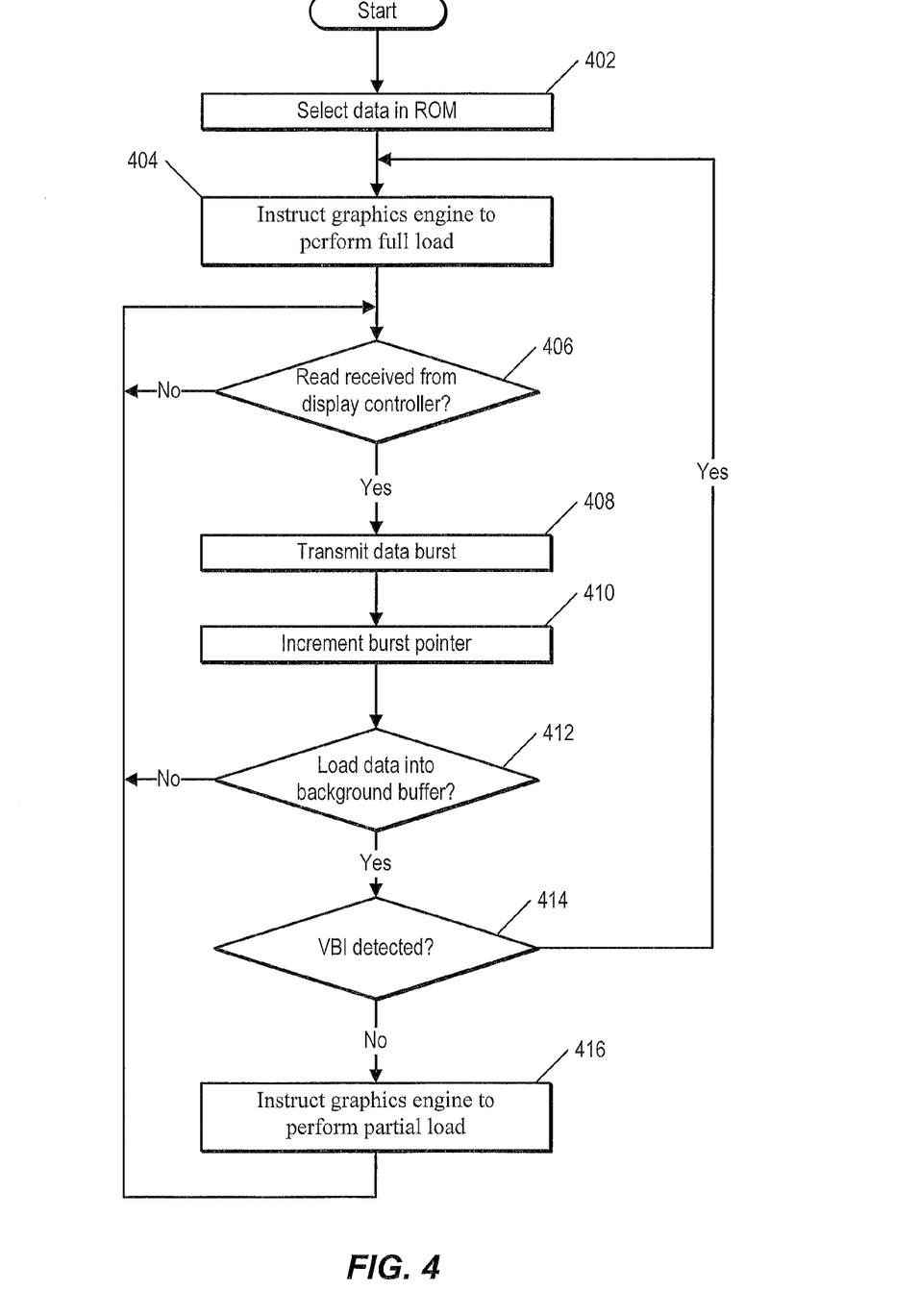
FIG. 4 is a flow chart illustrating an example process.

FIG. 4 shows an example process. The processes shown in FIG. 4, and in the remaining FIGS. 6-8, may be modified in order to derive alternative embodiments. Also, the steps in these figures are shown in sequential order. However, certain steps may occur in a different order than shown, certain steps may be performed concurrently, certain steps may be combined with other steps, and certain steps may be absent in another embodiment.

In one embodiment, the process shown in FIG. 4 is performed by a processor, such as processor 110 of FIG. 2. In some embodiments, the operations of FIG. 4 can be performed by or in conjunction with one or more other components of an MCU, such as graphics engine 140 of MCU 100 of FIG. 2.

The process shown in FIG. 4 involves loading successive portions of data, such as a background image, into a background buffer in RAM, such as background buffer 124 in RAM 120 of FIG. 3A. The loads are synchronized with the data being read and displayed by a display controller, such as display controller 180 of FIG. 2. Synchronizing the timing of loading data into RAM with the rate at which the data is read or consumed by a display controller, such as display controller 180 of FIG. 2, facilitates display of an entire full-frame sized background image to a display, such as display 190 of FIG. 2, though the RAM never stores more than a portion of the background image at any one time. The processor determines when the data will be read by the display controller and loads the portions of data into the background buffer in advance of the display controller reading the background buffer. In one embodiment, the display controller blends the background image with one or more foreground images to produce a blended image, which the display controller outputs to the display.

At 402, the processor selects data in ROM, such as compressed data 132 in ROM 130 of FIG. 3B. The data comprises one or more compressed images that will be used as a background in a layered graphics application. In one embodiment, selecting the data involves locating a specified file, e.g., determining a file name and/or an address associated with the beginning of the file. The processor also initializes a pointer, such as expansion pointer 134 of FIG. 3B, to point to the beginning of the data.

The processor instructs, at 404, a graphics engine, such as graphics engine 140 of FIG. 2, to perform a full load of background layer data. Performing a full load involves the graphics engine expanding enough data to completely fill a background buffer, or line buffer, in the RAM, such as background buffer 124 of FIG. 3A. In one embodiment, the processor determines the size of the background buffer. For example, the processor determines that the background buffer can store 16 lines of data, or the corresponding number of bytes. In response to determining the size of the background buffer, the processor instructs the graphics engine to expand (decompress) enough data to fill the background buffer in its entirety. The processor also increments the expansion pointer to point to the next data in ROM that is to be expanded. In response to expanding the data, the processor instructs the graphics engine to write the data to the background buffer in RAM. The processor also initializes a pointer, such as burst pointer 124 of FIG. 3A, to point to the beginning of the background buffer.

At 406, the processor determines whether a read of the background buffer has been received from the display controller. If no read is received from the display controller, the processor waits until a read is detected. In response to detecting a read from the display controller, the processor initiates transmission of a burst of data from the background buffer to the display controller, at 408. For example, the processor determines the location of the burst pointer, and copies data from the location specified by the burst pointer onto a data bus. In one embodiment, the read request specifies a size of a portion of data to read, and the portion of data is read from the background buffer and transmitted to a line cache, such as cache 182, of FIG. 2.

At 410, the processor increments a burst pointer, such as burst pointer 128 of FIG. 3A, to point to the data immediately following the data that has just been read. The next read by the display controller will access data at the location in the background buffer indicated by the updated burst pointer. At 412, the processor determines whether another portion of background data should be expanded from ROM and written to the background buffer. In one embodiment, the threshold condition for loading more background data into the background buffer specifies an amount of data having been read from the background buffer, such as N/2 lines, where N represents the number of lines of data that the background buffer is capable of holding. For example, the processor can logically divide the background buffer into two portions, though more divisions can be used. In response to determining that the entirety of one of the portions has been read, e.g., by determining that the burst pointer has reached and/or passed the end of the portion, e.g., as indicated by a logical or physical address, the processor determines that more background data should be loaded into the background buffer and determines whether a full load is needed, or a partial load. In one embodiment, the processor can base its determination of whether to load more data on a calculated amount of time, e.g., using the vertical refresh rate of the display, or can receive an event, e.g., generated by the display controller, that indicates a specified amount of data has been displayed. If neither the entire portion of the background buffer (e.g., 8 lines) has been read, e.g., as indicated by evaluating the position of the burst pointer, nor an event has been received indicating more background data should be read, the method returns to 406 and waits for additional data to be read by the display controller.

The processor determines, at 414, whether a vertical blanking interval (VBI) is detected. In one embodiment, this involves determining whether the processor has detected an event generated by the display controller indicating that an entire frame has been displayed. If so, the processor returns to 404, refills the background buffer, and resets the burst pointer to the beginning of the background buffer. In one embodiment, the event indicates the start of a frame, rather than the completion of a frame. If the VBI is not detected, the processor instructs the graphic engine to perform a partial load at 416. In one embodiment, performing a partial load involves expanding N/2 lines of compressed data from ROM, and writing the compressed data to portion of the background buffer that was just read, e.g., the first portion of the background buffer if the pointer is at N/2, or the second portion of the background buffer if the burst pointer is at the beginning of the background buffer. In this way, while data for a single frame is being read and displayed, the processor overwrites the portion of the background buffer that was just read, while the other portion is being read. Decompressing background data and filling one portion of the background buffer concurrently with another portion being consumed by the display controller results in background data being available for the display controller in advance of being needed. This synchronization of decompression on the one hand with displaying on the other facilitates reduction in the amount of RAM used to display a frame of data. While the foregoing operations are described in terms of the processor handling various tasks associated with reading and writing data, it is understood that the read and write can be performed in part or in the entirety by additional components of the MCU, such as DMAC/DTC module 160 of FIG. 2.

Figure 5:
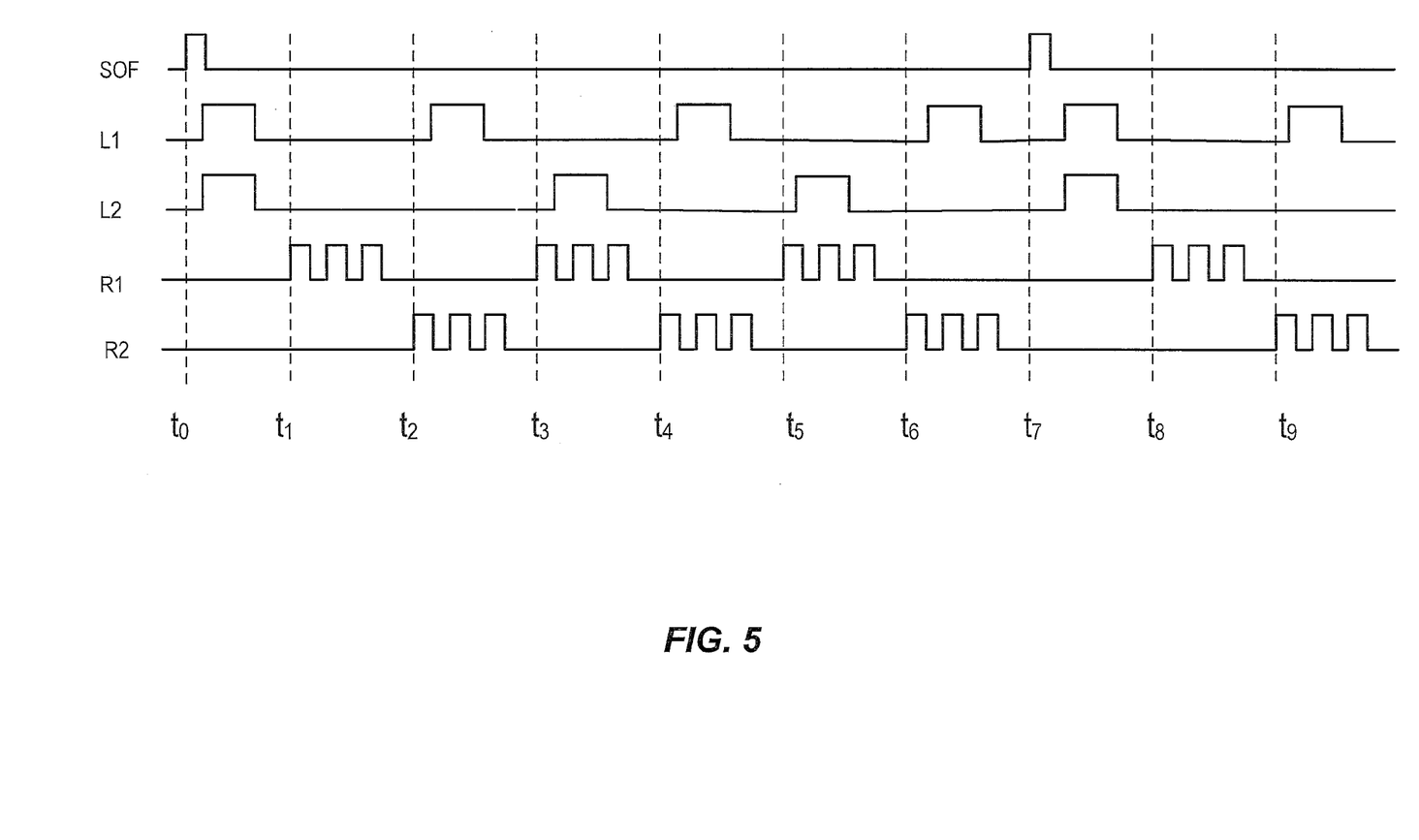
FIG. 5 is a timing diagram illustrating an example sequence.

The above description is further explained with reference to the timing diagram depicted in FIG. 5. FIG. 5 shows the synchronized relationship between making data available in a background buffer, such as background buffer 124 in RAM 120 of FIG. 3A and the consumption, or reading of that data, e.g., by a display controller such as display controller 180 of FIG. 2. FIG. 5 shows a start of frame (SOF) signal. This signal is asserted, e.g., by the display controller in response to the display controller beginning to display a frame of data. In one embodiment, the SOF signal is implemented as an event generated by the display controller and transmitted to a graphics engine, such as graphics engine 140 of FIG. 2.

The graphics engine, in response to detecting the SOF signal, performs a full load of the background buffer. This is indicated by the L1 and L2 signals being asserted. Assertion of the L1 signal corresponds to loading of a first portion of the background buffer and assertion of the L2 signal corresponds to loading of a second portion of the background buffer. While the present example describes the background buffer as having two portions, and therefore describes the existence of two corresponding signals, more portions can be used in analogous fashion.

FIG. 5 also shows signals R1 and R2. R1 is asserted when the display controller reads a burst of data from the first portion of the background buffer. For example, the display controller asserts R1 each time the display controller reads a 512 pixel burst of data from the first portion of the background buffer. During the interval between $t_1$ and $t_2$, FIG. 5 shows R1 being asserted several times. This is representative of the display controller reading the entire contents of the first portion of the background buffer. Though R1 is shown as going high only three times, this number is chosen only for the sake of illustration, and the number of bursts would likely be greater than three, though fewer bursts can be used. For example, if the first portion of the background buffer holds 16 lines of data, and each line is 270 pixels long, a read of 512 pixels would consume slightly less than two lines of data. To read the entire first portion, assuming 16 lines worth of data is stored therein, and the burst size is 512 pixels, approximately 9 bursts would be performed.

After all of the data in the first portion of the background buffer is consumed, the display controller reads data from the second portion of the background buffer, as shown by the assertion of R2 during the time interval between $t_2$ and $t_3$. The graphics engine detects that the first portion has been completely read, and concurrent with the reading of the second portion, decompresses additional background data and writes the background data to the first portion, as shown by the assertion of L1 during the time interval between $t_2$ and $t_3$. After, the second portion is completely read, the display controller reads from the first portion, while the graphics engine writes additional background data to the second portion, as shown for the time interval between $t_3$ and $t_4$. This repeats until an entire frame is displayed, and/or the graphics engine detects a SOF signal, as shown at $t_7$. After the SOF signal is again detected, the graphics engine decompresses the next portion, e.g., 16 lines, of background data and loads the decompressed background data into the background buffer. The process repeats indefinitely, or until interrupted, with a complete frame being displayed, for example, 60 times per second, though no more than 16 lines of background data is ever stored in RAM at any one time. The number of iterations involved in displaying a complete frame will likely exceed those shown in FIG. 5, though fewer iterations may be used.

Figure 6:
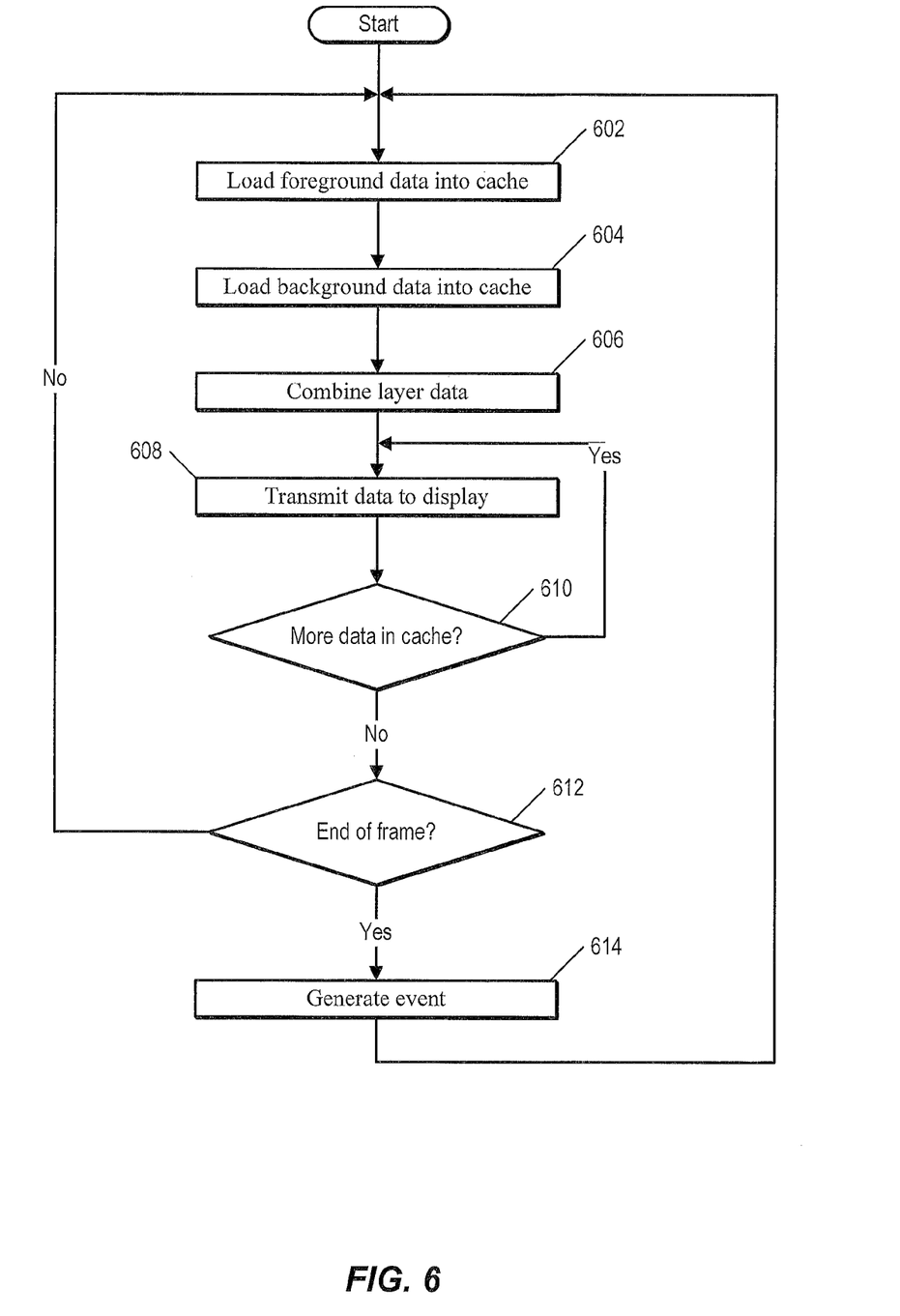
FIG. 6 is a flow chart illustrating an example process.

FIG. 6 is an example process performed by a display controller, such as display controller 180 of FIG. 2. The process shown in FIG. 6 involves the display controller acquiring foreground and background data, blending the layers, and transmitting the blended data to a display. At 602, the display controller loads foreground data into a line cache, such as cache 184 of FIG. 2. In one embodiment, the display controller accesses a foreground buffer, such as foreground buffer 122 of FIG. 3A at a location specified by a pointer, such as burst pointer 126. The display controller reads a specified amount of data, such as 512 pixels worth of data, from the foreground buffer, and writes the data into the line cache. The pointer is updated, either by the display controller, or by a processor, such as processor 110 of FIG. 2. The amount of data read in a burst can be specified by a user or determined automatically based, for example, on one or more system and/or performance characteristics.

At 604, the display controller loads background data into a line cache, such as cache 182 of FIG. 2. In one embodiment, the display controller accesses a background buffer, such as background buffer 124 of FIG. 3A at a location specified by a pointer, such as burst pointer 128. The display controller reads a specified amount of data, such as 512 pixels worth of data, from the background buffer, and writes the data into the line cache. The pointer is updated, either by the display controller, or by the processor.

The display controller, at 606, combines, or blends, the foreground data with the background data. For example, the display controller superimposes the foreground over the background using a specified opacity value for the foreground data. The display controller, in one embodiment, stores the combined data in a line cache, such as cache 186 of FIG. 2. At 608, the display controller transmits the blended data to a display, such as display 190 of FIG. 2.

At 610, the display controller determines whether there is more blended data in the line cache. If so, the method returns to 608, and the display controller transmits additional data to the display. If there is no more data in the cache, the display controller determines, at 612, whether the end of a frame has been reached. In one embodiment, this involves determining whether a vertical synchronization signal has been received from the display. If the end of frame has not been reached, the method returns to 602, and the display controller loads more data into its caches. If an end of frame is reached, as determined by the display controller at 612, the display controller generates an event, at 614, indicating that the end of frame has been reached. In one embodiment, the event signals the beginning of the vertical blanking interval. The method then returns to 602, and the display controller loads additional data into its caches.

Figure 7:
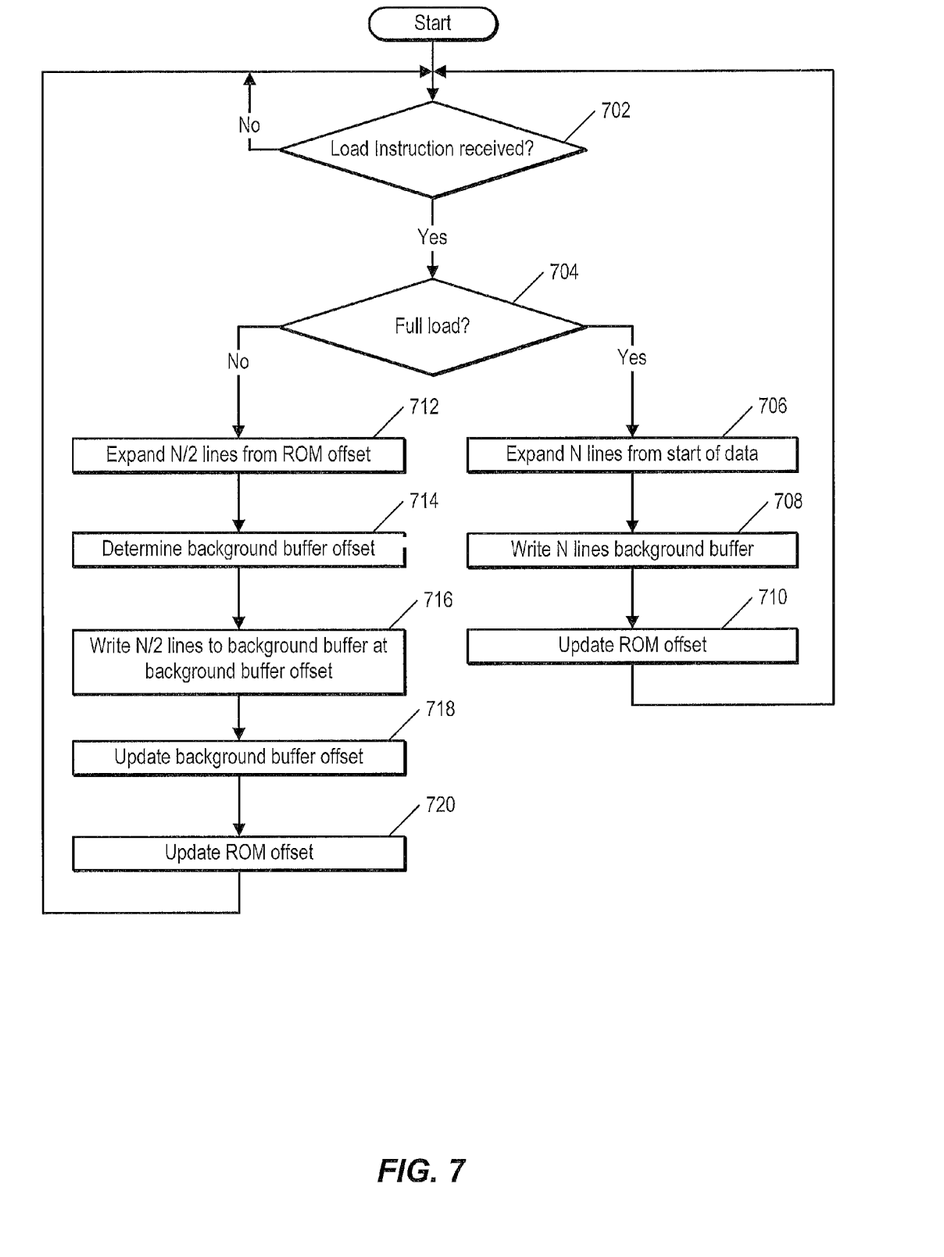
FIG. 7 is a flow chart illustrating an example process.

FIG. 7 shows an example method performed by a graphics engine, such as graphics engine 140 of FIG. 2. The graphics engine decompresses data, such as data stored in ROM 130 of FIG. 2, and writes the data into RAM, such as RAM 120 of FIG. 2. The graphics engine decompresses the data and writes the data to RAM in advance of the data being desired by a display controller, such as display controller 180 of FIG. 2. In one embodiment, the display controller generates a signal, such as an event or other indication, and transmits the signal to the graphics engine. The signal can be transmitted directly, or via a processor, interrupt controller, or via any other suitable mechanism. In response to detecting the signal, the graphics engine ensures that data is available in the RAM, e.g., by decompressing the data and writing the data to RAM, prior to a time at which the display controller seeks to read the data.

In one embodiment, the display controller indicates when a vertical refresh, or start of frame, will occur. At or after the start of frame, the display controller reads data from the RAM and writes the data at the first pixel of a display, such as display 190 of FIG. 2. The graphics engine, after detecting the signal, e.g., the start of frame event, makes sure the data is decompressed and stored in RAM so that the display controller can fetch the data. The signal indicating the start of frame is phase locked to the vertical refresh rate of the display, e.g., At 702, the graphics engine determines whether a load instruction, such as the signal, has been detected, or received. In one embodiment, the load instruction is received from a processor, such as processor 110 of FIG. 2, and indicates that compressed data stored in a ROM, such as ROM 130 of FIG. 2, should be expanded and written to a RAM, such as RAM 120 of FIG. 2.

In response to determining that a load instruction has been received, the graphics engine determines, at 704, whether the load instruction indicates that a full load should be performed. The signal described above as occurring once per vertical refresh interval, triggers a full load. That is, at the start of each frame, the graphics engine performs a full load. Between full loads, the graphics engine performs partial loads. A partial load occurs each time a predetermined amount of the background buffer is read. For example, if 16 lines of data are stored in the background buffer, after the display controller reads the first 8 lines, and while the display controller is reading the second 8 lines, the graphics engine decompresses an additional 8 lines of data and stores the additional 8 lines in the region of the background buffer allocated for the first 8 lines, overwriting the data previously stored in that region. In one embodiment, the display controller generates an event each time a partial load is to be executed. For example, the display controller can generate an event in response to reading 8 lines of data from the background buffer. The graphics engine, in response to detecting or receiving the signal, decompresses an additional 8 lines and stores them in the appropriate place in the background buffer. In one embodiment, the display controller generates one type of event to indicate a full load, and a second type of event to indicate partial loads. The events indicating a partial load should be performed, similar to those indicating a full load should be performed, can be generated by the display controller, an interrupt controller, a processor, or any other appropriate mechanism. In one embodiment, the display controller is configured to generate signals for partial loads based on the vertical refresh rate of the display and to transmit those signals to the graphics engine. In one embodiment, the graphics engine performs the calculations. For example, given that the vertical refresh rate is 60 Hz, and that the number of lines in a frame is 480, the graphics engine can determine that a partial load should be performed approximately every 0.5 milliseconds. The example calculation is as follows. In this example, the display controller writes 480 lines 60 time per second, or 28,800 lines per second. So the time taken to write each line is $1/28,800$ seconds. The time to write 16 lines is therefore $16/28,800$, or 0.56 milliseconds. The graphics engine can calculate the interval at which a partial load should be performed and perform partial loads at the appropriate times.

In response to determining that a full load is not requested, the graphics engine performs, beginning at 712, a partial load. In one embodiment, the graphics engine expands N/2 lines of data, where N is the size in lines of a background buffer in the RAM, from a location in ROM identified by a ROM offset, such as expansion pointer 134 of FIG. 3B. At 714, the graphics engine determines the RAM offset. In one embodiment, the RAM offset is a value of a pointer, such as burst pointer 128 of FIG. 3A, that identifies a location in a background buffer, such as background buffer 124 of FIG. 2. At 716, the graphics engine writes the expanded data, e.g., the N/2 lines of data, to RAM at the location specified by the RAM offset. The RAM offset is updated at 718 to indicate where a subsequent load instruction should store additional background data. This involves adding a value to the RAM offset, where the value indicates the amount of space consumed by the expanded data that was just loaded into the RAM. At 720, the ROM offset is updated to indicate where a subsequent read operation should occur. This involves adding a value to the ROM offset, where the value indicates the amount of space consumed by the compressed data that was just expanded out of the ROM. In one embodiment, the graphics engine updates the RAM offset and the ROM offset. In one embodiment, either or both could be updated by the processor.

If the graphics engine determines at 704 that a full load is requested, the graphics engine expands N lines from the start of the compressed data, at 706. At 708, the graphics engine writes the N lines to the background buffer. The ROM offset is updated, at 710, either by the graphics engine or the processor. In one embodiment, the ROM offset is incremented by N.

Figure 8:
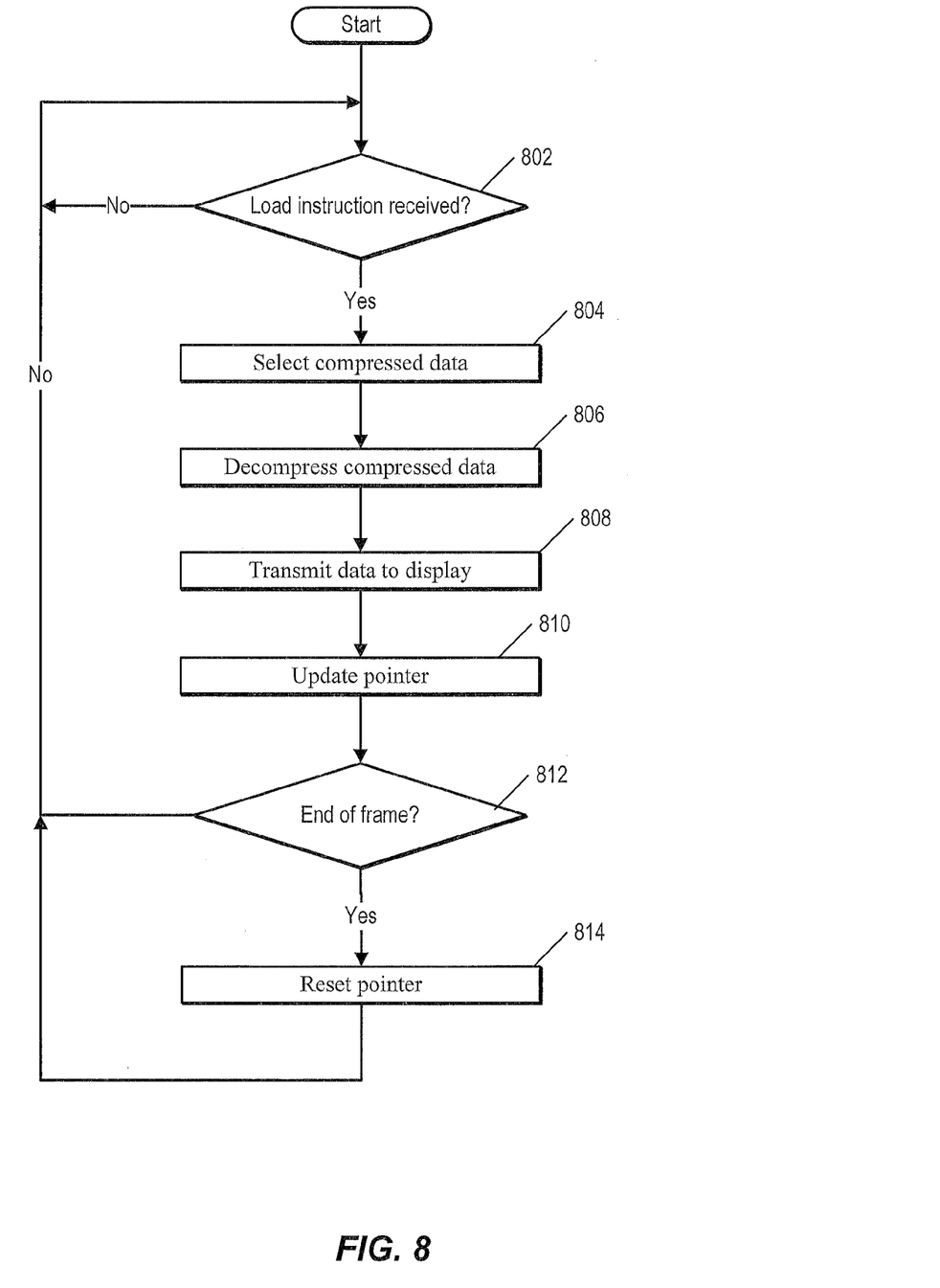
FIG. 8 is a flow chart illustrating an example process.

FIG. 8 shows an example method performed by a graphics engine, such as graphics engine 140 of FIG. 2. As described with regard to FIG. 8, the graphics engine reads compressed data for an image to be used in a background layer from a memory, such as ROM 130 of FIG. 2. Though described in terms of on-chip ROM, any type or form of storage device or medium capable of storing data and/or other computer-readable instructions can be used, including off-chip memory, such as flash memory. The graphics engine expands the data into a cache maintained by a display controller, such as one of caches 182-184 shown as included display controller 180 of FIG. 2. In the embodiment of FIG. 8, the graphics engine includes an RLE decoder configured to decompress data that has been compressed using an RLE compression algorithm. The method of FIG. 8 expands image data from a ROM and transmits the image data to the display controller without the intermediate write to on-chip RAM, such as RAM 120 of FIG. 2.

At 802, the graphics engine determines whether a load instruction has been received. The load instruction is received, in one embodiment, from the display controller and indicates that the display controller is ready to receive a portion of data for display as a background in a multi-layer display. In one embodiment, the display controller sends a load instruction in response to determining that a cache designated for background data is empty. In another embodiment, the display controller sends a load instruction for background data concurrently with (in response to) sending an instruction to load data for one or more other layers. The load instruction specifies, in one embodiment, an amount of data the display controller wishes to receive and also includes information identifying a location to which the data should be transferred, such as a cache identifier and/or a memory address.

At 804, the graphics engine selects the specified amount of data from a location in the ROM. In one embodiment, determining the location involves determining a value identified by a ROM pointer, such as expansion pointer 134 of FIG. 3B, or an address specified by the load instruction. At 806, the graphics engine expands, or decompresses, the data using a decompression algorithm. The graphics engine determines the type of encoding used, e.g., RLE, and selects an appropriate decoding algorithm. Using the decoding algorithm, the graphics engine expands the data.

The graphics engine transmits, at 808, the expanded data to the display controller. In one embodiment, this involves sourcing the expanded data onto one or more buses, such as are included in communication infrastructure 108 of FIG. 2. The display controller receives the expanded data and stores the data in its cache. At 810, the graphics engine updates the ROM offset to indicate where a subsequent read operation should occur. This involves adding a value to the ROM offset, where the value indicates the amount of space consumed by the compressed data that was just expanded out of the ROM.

The graphics engine determines, at 812, whether the end of the frame, or image, has been reached. In one embodiment, this involves detecting an event or signal generated by the display controller, such as an end of frame signal. In another embodiment, the graphics engine determines whether the ROM pointer has reached the last memory location allocated to the compressed image. If the graphics engine determines that the end of the frame has been reached, the graphics engine resets the ROM pointer to point to the beginning of the compressed data.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method implemented in a microcontroller (MCU), the method comprising:
   expanding a first portion of compressed data that is stored in a read only memory (ROM) of the MCU;
   writing the expanded first portion to a first memory location in a random access memory (RAM) of the MCU; and
   in response to detecting that a first segment of the expanded first portion has been read from the RAM, expanding a second portion of the compressed data and writing the expanded second portion to the first memory location;
   wherein the MCU, including the ROM and the RAM thereof, is formed on an integrated circuit.

2. The method of claim 1, further comprising:
   in response to detecting that a second segment of the expanded first portion has been read from the RAM, expanding a third portion of the compressed data and writing the expanded third portion to a second memory location of the RAM.

3. The method of claim 1, wherein
   the compressed data comprises compressed image data, and;
   the ROM comprises flash memory.

4. The method of claim 1, wherein
   the first segment of the expanded first portion is read by a display controller of the MCU.

5. The method of claim 1, further comprising:
   detecting that all of the compressed data has been expanded; and
   updating a pointer to point to a beginning of the compressed data.

6. The method of claim 1, wherein
reading the first segment comprises a series of reads,
each read of the series of reads involves a respective subset of the first segment, and
the series of reads is synchronized to an event that is proportional to a vertical frame rate specified by a display controller of the MCU.

7. The method of claim 6, further comprising:
updating a pointer in response to the each read.

8. The method of claim 1, further comprising:
detecting an event that indicates a frame has been displayed; and
in response to the detecting the event, expanding a second portion of the compressed data and writing the expanded second portion to the first memory location.

9. The method of claim 1, wherein
the compressed data comprises run length encoded data, and;
the ROM comprises flash memory.

10. A system comprising an integrated circuit, the integrated circuit comprising a microcontroller (MCU), wherein
the MCU comprises
a graphics engine,
a read only memory (ROM);
a random access memory (RAM), and
a display controller, and
the MCU is configured to
expand a first portion of compressed data held in the ROM;
write the expanded first portion to a first memory location in the RAM; and
in response to detecting that a first segment of the expanded first portion has been read from the RAM, expand a second portion of the compressed data and write the expanded second portion to the first memory location.

11. The system of claim 10, wherein
the compressed data comprises compressed image data, and;
the ROM comprises flash memory.

12. The system of claim 10, wherein the MCU is further configured to:
detect that all of the compressed data has been expanded; and
update a pointer to point to beginning of the compressed data.

13. The system of claim 10, wherein
reading the first segment comprises a series of reads,
each read of the series of reads involves a respective subset of the first segment, and
the series of reads is synchronized to an event that is proportional to a vertical frame rate specified by a display controller.

14. The system of claim 13, wherein the MCU is further configured to:
update a pointer in response to the each read.

15. The system of claim 10, wherein the MCU is further configured to:
detect an event that indicates a frame has been displayed; and
in response to detecting the event, expand a second portion of the compressed data and write the expanded second portion to the first memory location.

16. A non-transitory computer readable storage medium storing instructions, which when executed by a processor of a microcontroller (MCU), implements a method, the method comprising:
expanding a first portion of compressed data stored in read only memory (ROM) of the MCU;
writing the expanded first portion to a first memory location in random access memory (RAM) of the MCU; and
in response to detecting that a first segment of the expanded first portion has been read from the RAM, expanding a second portion of the compressed data and writing the expanded second portion to the first memory location;
wherein the MCU, including the ROM and the RAM thereof, is formed on an integrated circuit.

17. The non-transitory computer readable storage medium of claim 16, wherein
the compressed data comprises compressed image data, and;
the ROM comprises flash memory.

18. The non-transitory computer readable storage medium of claim 16, wherein the method further comprises:
detecting that all of the compressed data has been expanded; and
updating a pointer to point to beginning of the compressed data.

19. The non-transitory computer readable storage medium of claim 16, wherein reading the first segment comprises a series of reads,
each read of the series of reads involves a respective subset of the first segment, and
the series of reads is synchronized to an event that is proportional to a vertical frame rate specified by a display controller.

20. The non-transitory computer readable storage medium of claim 16, wherein the method further comprises:
updating a pointer in response to the each read.

21. The non-transitory computer readable storage medium of claim 16, wherein the method further comprises:
detecting an event that indicates a frame has been displayed; and
in response to detecting the event, expanding a second portion of the compressed data and write the expanded second portion to the first memory location.

* * * * *